United States Patent
Bonvillain et al.

(10) Patent No.: US 6,244,614 B1
(45) Date of Patent: Jun. 12, 2001

(54) TRAILER HITCH LOCK

(76) Inventors: Gary J Bonvillain, 126 Bernard St., Patterson, LA (US) 70392; Herbert P Stanley, 1012 Fig St., Morgan City, LA (US) 70380

( * ) Notice: Subject to any disclaimer, the term of this patent is extended or adjusted under 35 U.S.C. 154(b) by 0 days.

(21) Appl. No.: 09/433,182

(22) Filed: Nov. 3, 1999

(51) Int. Cl.$^7$ ....................................................... B60D 1/58
(52) U.S. Cl. ......................... 280/507; 70/58; 70/DIG. 27
(58) Field of Search .................................. 280/507, 511; 70/58, 258, 57, 14, DIG. 27

(56) References Cited

U.S. PATENT DOCUMENTS

| | | | |
|---|---|---|---|
| 4,032,171 | * | 6/1977 | Allen et al. ............................ 280/507 |
| 4,141,569 | * | 2/1979 | Dilk ....................................... 280/507 |
| 4,291,557 | | 9/1981 | Bulle et al. . |
| 4,459,832 | * | 7/1984 | Avrea et al. ...................... 280/507 X |
| 4,571,964 | | 2/1986 | Bratzler . |
| 5,087,064 | * | 2/1992 | Guhlin ............................. 280/511 X |
| 5,147,096 | * | 9/1992 | Rogers ................................. 280/507 |
| 5,322,316 | * | 6/1994 | Wheeler ........................... 280/511 X |
| 5,700,024 | * | 12/1997 | Upchurch ............................. 280/507 |
| 5,752,398 | | 5/1998 | Villalon, Jr. . |
| 5,775,139 | * | 7/1998 | Sellers ............................. 280/507 X |
| 5,794,961 | * | 8/1998 | Niswanger ........................... 280/507 |
| 5,873,271 | * | 2/1999 | Smith ...................................... 70/58 |
| 5,937,679 | | 8/1999 | Villalon, Jr. . |
| 6,070,441 | * | 6/2000 | Bernstrom ....................... 280/507 X |

* cited by examiner

*Primary Examiner*—J. J. Swann
*Assistant Examiner*—F. Zeender
(74) *Attorney, Agent, or Firm*—John D. Jeter

(57) ABSTRACT

A ball fastened to a base plate is received within the socket of a trailer hitch, with a box shaped, open ended housing slipped over the exposed end of the tongue, hitch, and plate. The plate has a pierced tang that extends through the closed end of the housing and into a tubular extension projecting from the housing. A purchase item cylindrical, keyed, tumbler operated, lock slips into the bore of the extension and projects a key operated, retractable, transversely movable, shot bolt through the pierced hole of the tang. The lock is protected within the extension, and the apparatus has no parts exposed for tampering.

9 Claims, 1 Drawing Sheet

TRAILER HITCH LOCK

BACKGROUND

Trailers such as boat trailers are often left unattended in remote locations. As a consequence they are often stolen, and often locking devices in place are cut away. Locking devices in use are usually apparatus that occupies the hitch socket and have shrouds, that prevent their removal, secured by padlocks. With simple prior preparation, modern tools can cut the lock bolt rather quickly. Unless the hitch lock is apparently secure against violation, efforts to remove it can disable the lock, rendering the trailer temporarily useless to the legitimate user.

SUMMARY OF INVENTION

A plate is welded to a ball to be secured in the ball socket of the hitch. A box-like shroud, shaped to enclose the exposed end of the hitch tongue is then slipped over the plate. A tang, with a transverse eye, extending from the plate protrudes into a cylindrical recess on the box. A tumbler type lock with a shot bolt that is movable with a key in the tumbler is inserted into the recess and actuated with the key to insert the bolt through the eye. With the key removed and the lock Imbedded in the recess no part of the security system is accessible to the known available lock cutting tools. A combination lock can replace the keyed tumbler lock.

BRIEF DESCRIPTION OF DRAWINGS

In the drawings wherein like features have similar captions.

DETAILED DESCRIPTION OF DRAWINGS

Figure 1:
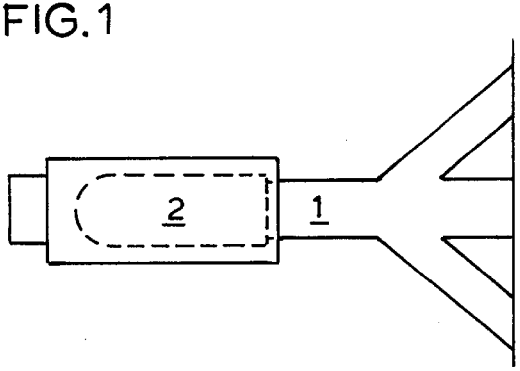
FIG. 1 is a top elevation of a typical trailer hitch with the preferred embodiment installed.

In the drawings, features well established in the art and not bearing upon points of novelty are omitted in interest of descriptive clarity. Such omitted features include weld lines and threaded junctures, and the like.

FIG. 1 shows a typical trailer hitch tongue 1 with the housing 2 of the lock apparatus in place.

Figure 2:
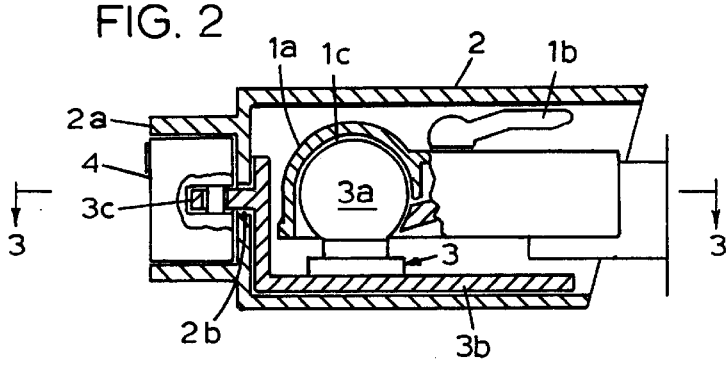
FIG. 2 is a side view of the arrangement of FIG. 1, somewhat enlarged and partly cut away.

FIG. 2 shows tongue 1 with a typical coupler in place with a socket assembly 1a for ball receiving socket 1c and the usual securing lever 1b. Lower portion 3 has ball 3a attached to a bent plate 3b. Plate 3b has tang 3c extending through hole 2b. Housing 2 is an open ended box structure that receives and encloses the hitch socket assembly 1a and plate 3b. Tubular extension 2a has a cylindrical bore that receives a purchase item tumbler lock 4. The shape of the bore is defined by the shape of the lock assembly to be accommodated. Lock 4 has an opening that accepts tang 3c. Tang 3c has a vertical hole 3d. The lock 4 has a shot bolt that is actuated by the keyed tumbler (not shown) to extend into the vertical hole. Lock 4 is secured in the recess when the shot bolt is in the vertical hole of the tang. It is also secured by a set screw (not shown) to keep the lock in place when, the apparatus is removed from the hitch. The set screw is not essential to the lock security when the apparatus is in service and it is often omitted.

Figure 3:
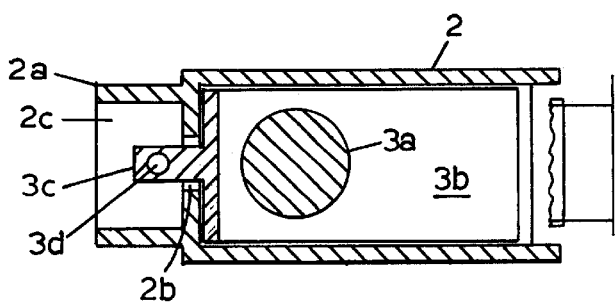
FIG. 3 is a top view of the arrangement of FIG. 2 with the top of part of the lock enclosure cut away.

FIG. 3 is a top view with the housing cut along line 3—3 if FIG. 2. This view shows the vertical hole 3d, ball 3a, and plate 3b but the terminal end (socket assembly) 1a of the trailer tongue is absent.

Figure 4:
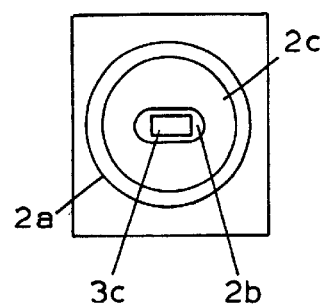
FIG. 4 is an end view of the arrangement of FIG. 1.

FIG. 4 is a front view showing the tubular extension 2a with the lock 4 omitted. The preferred lock is a purchase item sold as the American Lock Companies Series 2000. Other recess fitting locks of the type shown may be available, and usable.

Lock 4 could be made with the direction of installation situated perpendicular to that shown. The opening for the tang would extend into the side of a purchasable lock assembly. The tubular opening 2c, circular or otherwise, would then be perpendicular to that shown. That is anticipated by and is within the scope of the claims.

Figure 5:
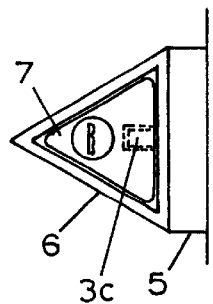
FIG. 5 is a partial side view, from the aspect of FIG. 2, of an alternate form of the invention.

FIG. 5 is a view from the same aspect as FIG. 2, of somewhat smaller scale, showing the transverse slideway in tube 6 for keyed tumbler lock mechanism 7. Note the non-circular nature of the slideway. Lock 7 is not known to be currently available but, when available, the slideway configuration can be selected to fit. Tang 3c is shown unchanged but can also be shaped to fit the requirements of the lock. The tang could have a lock engagement notch rather than a hole for the lock shot bolt.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

What is claimed is:

1. A trailer anti-theft locking apparatus to secure the tongue of a trailer hitch having a hitch ball receiving socket, the apparatus comprising:
   a) a ball for insertion into the socket of the trailer hitch, the ball having a base plate attached thereto, the base plate having a tang projecting therefrom whereby the tang has a lock engaging surface thereon;
   b) a housing with an open end to receive said trailer hitch and said base plate, the housing having a hole in an opposite end to receive said tang, the hole opening into a tubular extension extending a selected distance from said opposite end; and
   c) a lock to be received into said tubular extension, having key operated means to releasably engage and secure said lock engaging surface.

2. The apparatus of claim 1 wherein said lock is a purchase item.

3. The apparatus of claim 2 wherein said lock is a combination lock and said key is a combination of characters.

4. A trailer anti-theft locking apparatus comprising:
   a) a ball for insertion into a socket of a trailer hitch, the ball having a base plate attached thereto, the base plate having a tang projecting therefrom whereby the tang has a transverse hole therein;
   b) a housing with an open end to receive said trailer hitch and said base plate, the housing having a hole in an opposite end to receive said tang, the hole opening into a tubular extension extending a selected distance from said opposite end; and c) a lock to be received into said tubular extension, having a key operated transversely movable shot bolt to retractably extend into said transverse hole.

5. The apparatus of claim 4 wherein said ball is welded to said base plate.

6. The apparatus of claim 4 wherein said base plate has a right angle bend to extend adjacent said ball to support said tang.

7. An anti-theft trailer hitch lock for a ball and socket type trailer tongue, comprising: a ball for insertion into said socket, the ball having a base plate attached thereto, an open ended box housing with a longitudinal dimension for enclosing said base plate and an exposed end of said tongue, said housing having a closed end with an opening therein, the opening extending into the bore of a tubular extension attached to and projecting some distance from said housing, the tubular extension adapted to receive a key operated lock, a tang attached to said base plate, the tang extending through said opening and having a transverse hole therein to receive a retractable key actuated shot bolt movably attached to said lock.

8. The apparatus of claim 7 wherein said tubular extension has an extended centerline that is generally parallel to said longitudinal dimension.

9. The apparatus of claim 7 wherein said tubular extension has a bore centerline that is generally perpendicular to said longitudinal dimension.

\* \* \* \* \*